(12) United States Patent
Fornos Martinez et al.

(10) Patent No.: US 12,358,229 B2
(45) Date of Patent: Jul. 15, 2025

(54) COLOURED OBJECTS IN ADDITIVE MANUFACTURING (71) Applicant: Peridot Print LLC, Palo Alto, CA (US)

(72) Inventors: Pol Fornos Martinez, Sant Cugat del Valles (ES); Ismael Fernandez Aymerich, Sant Cugat del Valles (ES); Maria De Las Mercedes Blanco Rollan, Sant Cugat del Valles (ES)

(73) Assignee: Peridot Print LLC, Palo Alo, CA (US)

( * ) Notice: Subject to any disclaimer, the term of this patent is extended or adjusted under 35 U.S.C. 154(b) by 221 days.

(21) Appl. No.: 17/263,208

(22) PCT Filed: Mar. 15, 2019

(86) PCT No.: PCT/US2019/022474
§ 371 (c)(1),
(2) Date: Jan. 26, 2021

(87) PCT Pub. No.: WO2020/190259
PCT Pub. Date: Sep. 24, 2020

(65) Prior Publication Data
US 2022/0324164 A1 Oct. 13, 2022

(51) Int. Cl.
B29C 64/153 (2017.01)
B29C 64/141 (2017.01)
(Continued)

(52) U.S. Cl.
CPC .......... B29C 64/393 (2017.08); B29C 64/141 (2017.08); B29C 64/153 (2017.08);
(Continued)

(58) Field of Classification Search
None
See application file for complete search history.

(56) References Cited

U.S. PATENT DOCUMENTS 6,165,406 A * 12/2000 Jang ............... G05B 19/4099
425/375
6,375,874 B1 * 4/2002 Russell ............... B41J 2/155
425/215
(Continued)

FOREIGN PATENT DOCUMENTS

CN   105599293 A   5/2016
CN   105916661 A   8/2016
(Continued)

OTHER PUBLICATIONS

Stratasys, F123 Series, 2008 (no month) (Year: 2008).*

Primary Examiner — Jeffrey A Vonch
(74) Attorney, Agent, or Firm — Michael Dryja (57) ABSTRACT In one example a method of additive manufacturing includes obtaining object model data and colour data. The object model data describes at least portion of an object to be generated in additive manufacturing using a build material having a first colour and a fusing agent having a second colour different from the first colour. The colour data describes an intended colour of at least portion of the object to be manufactured by additive manufacturing. The intended colour is substantially the first colour, the second colour or a colour therebetween. The method includes determining object generation instructions to apply the fusing agent to a first region of a layer of the build material. The first region of the layer corresponds to portion of the object and the instructions are to apply fusing agent at a contone level such that the colour of the portion of the object corresponding to the first region of the layer of build material is substantially the same as the intended colour as described by the colour data.

6 Claims, 4 Drawing Sheets (51) Int. Cl.

| | |
|---|---|
| *B29C 64/165* | (2017.01) |
| *B29C 64/386* | (2017.01) |
| *B29C 64/393* | (2017.01) |
| *B33Y 10/00* | (2015.01) |
| *B33Y 30/00* | (2015.01) |
| *B33Y 50/00* | (2015.01) |
| *B33Y 50/02* | (2015.01) |
| *B33Y 80/00* | (2015.01) |
| *B29C 64/171* | (2017.01) |
| *B29C 64/176* | (2017.01) |
| *B29C 64/182* | (2017.01) |
| *H04N 1/60* | (2006.01) |

(52) U.S. Cl.
CPC .......... *B29C 64/165* (2017.08); *B29C 64/386* (2017.08); *B33Y 10/00* (2014.12); *B33Y 30/00* (2014.12); *B33Y 50/02* (2014.12); *B33Y 80/00* (2014.12); *B29C 64/171* (2017.08); *B29C 64/176* (2017.08); *B29C 64/182* (2017.08); *B29K 2995/0021* (2013.01); *H04N 1/60* (2013.01)

(56) References Cited

U.S. PATENT DOCUMENTS

| | | | | |
|---|---|---|---|---|
| 6,401,002 | B1* | 6/2002 | Jang | B33Y 30/00 |
| | | | | 204/192.15 |
| 11,577,463 | B2* | 2/2023 | Huang | B29C 64/165 |
| 11,826,961 | B2* | 11/2023 | Lebron | B29C 64/386 |
| 11,938,681 | B2* | 3/2024 | Fornos Martinez | B29C 64/165 |
| 11,945,168 | B2* | 4/2024 | Jowkar | B29C 64/386 |
| 2002/0079601 | A1 | 6/2002 | Russell et al. | |
| 2004/0080078 | A1* | 4/2004 | Collins | B29C 64/165 |
| | | | | 425/375 |
| 2004/0176531 | A1* | 9/2004 | Morgan | C08G 18/10 |
| | | | | 524/590 |
| 2005/0001356 | A1* | 1/2005 | Tochimoto | B29C 64/165 |
| | | | | 425/130 |
| 2005/0287354 | A1* | 12/2005 | Jennings | B05D 7/14 |
| | | | | 428/323 |
| 2006/0235562 | A1* | 10/2006 | Knoppers | G05B 19/4099 |
| | | | | 700/119 |
| 2009/0068389 | A1* | 3/2009 | Maule | D21H 19/82 |
| | | | | 428/40.1 |
| 2009/0206065 | A1* | 8/2009 | Kruth | B29C 64/393 |
| | | | | 219/121.65 |
| 2010/0009133 | A1* | 1/2010 | Chait | B29C 64/112 |
| | | | | 427/8 |
| 2010/0301510 | A1* | 12/2010 | Coburn | B29C 48/08 |
| | | | | 428/315.9 |
| 2013/0040091 | A1* | 2/2013 | Dikovsky | B29C 64/135 |
| | | | | 428/68 |
| 2013/0168902 | A1* | 7/2013 | Herzog | B23K 31/125 |
| | | | | 264/401 |
| 2014/0277661 | A1* | 9/2014 | Amadio | G05B 19/4099 |
| | | | | 700/119 |
| 2014/0314613 | A1* | 10/2014 | Hopkinson | B33Y 30/00 |
| | | | | 264/460 |
| 2015/0091208 | A1* | 4/2015 | Sadusk | B29C 64/393 |
| | | | | 264/308 |
| 2015/0259548 | A1* | 9/2015 | Wang | B29C 64/386 |
| | | | | 428/339 |
| 2016/0112601 | A1* | 4/2016 | Misfeldt | H04N 1/32325 |
| | | | | 264/308 |
| 2016/0136898 | A1 | 5/2016 | Jang et al. | |
| 2016/0242505 | A1* | 8/2016 | Waatti | A43B 23/0215 |
| 2016/0332376 | A1* | 11/2016 | Ramirez Muela | G05B 19/19 |
| 2016/0332380 | A1* | 11/2016 | De Pena | B33Y 30/00 |
| 2016/0339636 | A1* | 11/2016 | De Pena | B33Y 30/00 |
| 2016/0342150 | A1 | 11/2016 | Jin et al. | |
| 2016/0346996 | A1* | 12/2016 | Hakkaku | B32B 1/00 |
| 2016/0349724 | A1* | 12/2016 | Cortes | G05B 19/4099 |
| 2017/0021569 | A1* | 1/2017 | Puigardeu Aramendia | |
| | | | | B29C 64/205 |
| 2017/0197366 | A1* | 7/2017 | Abbott, Jr. | B33Y 50/02 |
| 2017/0220031 | A1* | 8/2017 | Morovic, Jr. | B33Y 50/02 |
| 2017/0232677 | A1* | 8/2017 | Emamjomeh | B29C 64/386 |
| | | | | 264/494 |
| 2017/0269475 | A1 | 9/2017 | Kuo et al. | |
| 2017/0274594 | A1* | 9/2017 | Ng | B33Y 30/00 |
| 2018/0001550 | A1 | 1/2018 | Zhao et al. | |
| 2018/0001568 | A1* | 1/2018 | Sanchez Ribes | B33Y 30/00 |
| 2018/0029300 | A1* | 2/2018 | Batchelder | B29C 64/153 |
| 2018/0065297 | A1* | 3/2018 | Zhao | B29C 64/386 |
| 2018/0086045 | A1* | 3/2018 | Morovic | B33Y 50/02 |
| 2018/0117856 | A1* | 5/2018 | Ochi | B29C 64/112 |
| 2018/0229447 | A1 | 8/2018 | Mantell et al. | |
| 2019/0001557 | A1* | 1/2019 | Smith, III | B33Y 10/00 |
| 2019/0293550 | A1* | 9/2019 | Hess | B29C 64/153 |
| 2020/0159185 | A1* | 5/2020 | Watanabe | B33Y 50/00 |
| 2020/0164571 | A1* | 5/2020 | Huang | B33Y 10/00 |
| 2021/0187617 | A1* | 6/2021 | Zaepernick | B22F 10/50 |

FOREIGN PATENT DOCUMENTS

| | | | | |
|---|---|---|---|---|
| CN | 106103054 | A | 11/2016 | |
| CN | 107199699 | A | 9/2017 | |
| CN | 107548345 | A | 1/2018 | |
| CN | 108081588 | A | 5/2018 | |
| CN | 108437443 | A | 8/2018 | |
| CN | 109070459 | A | 12/2018 | |
| JP | 2016-144900 | A | 8/2016 | |
| WO | WO-2015072155 | A1* | 5/2015 | ......... B29C 67/0081 |
| WO | WO-2016019435 | A1 | 2/2016 | |
| WO | WO-2016053305 | A1* | 4/2016 | .......... B29C 64/165 |
| WO | WO-2016068899 | A1 | 5/2016 | |
| WO | WO-2016175813 | A1* | 11/2016 | .............. B22F 10/40 |
| WO | WO-2016186613 | A1* | 11/2016 | .......... B29C 64/165 |
| WO | WO-2016202404 | A1* | 12/2016 | .......... B29C 64/153 |
| WO | WO-2017011009 | A1* | 1/2017 | .......... B29C 64/386 |
| WO | WO-2017014785 | A1* | 1/2017 | .......... B29C 35/0805 |
| WO | WO-2017019046 | A1* | 2/2017 | .......... B29C 64/386 |
| WO | WO-2017019102 | A1* | 2/2017 | .............. B22F 10/28 |
| WO | WO-2017125128 | A1* | 7/2017 | ............ B22F 3/1055 |
| WO | WO-2017162306 | A1* | 9/2017 | .......... B29C 64/165 |
| WO | WO-2017180159 | A1 | 10/2017 | |
| WO | 2017/196358 | A1 | 11/2017 | |
| WO | WO-2017189306 | A1* | 11/2017 | .......... B29C 64/165 |
| WO | WO-2017196344 | A1* | 11/2017 | .......... B29C 64/165 |
| WO | WO-2017213666 | A1 | 12/2017 | |
| WO | WO-2018010773 | A1* | 1/2018 | .......... B29C 64/165 |
| WO | WO-2018022093 | A1* | 2/2018 | .......... B29C 64/165 |
| WO | WO-2018080456 | A1 | 5/2018 | |
| WO | WO-2018080501 | A1* | 5/2018 | .......... B29C 64/386 |
| WO | WO-2018144032 | A1* | 8/2018 | .......... B29C 64/165 |
| WO | WO-2018182594 | A1* | 10/2018 | .............. B22F 10/14 |
| WO | WO-2018194540 | A1* | 10/2018 | .............. B22F 10/10 |
| WO | WO-2018194631 | A1* | 10/2018 | .......... B29C 64/165 |
| WO | WO-2019013740 | A1* | 1/2019 | .......... B29C 64/393 |
| WO | WO-2019013745 | A1* | 1/2019 | .............. B29C 64/10 |
| WO | WO-2019013746 | A1* | 1/2019 | .............. B22F 10/00 |
| WO | WO-2019013749 | A1* | 1/2019 | .......... B29C 64/165 |
| WO | WO-2019013752 | A1* | 1/2019 | .............. B29C 64/10 |
| WO | WO-2019022770 | A1* | 1/2019 | .............. B22F 10/00 |
| WO | WO-2019209262 | A1* | 10/2019 | .............. B22F 10/10 |
| WO | WO-2019212517 | A1* | 11/2019 | .............. B22F 10/20 |

* cited by examiner

COLOURED OBJECTS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected sub-regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic or ceramic powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In this way, adding fusing agent to areas of the build material may change the absorptivity of those areas of the build material. In other examples, coalescence may be achieved in some other manner.

In an example, a suitable fusing agent may be an ink-type formulation comprising carbon black, such as, for example, the fusing agent formulation commercially known as V1Q60A "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based coloured ink and pigment based coloured ink, such as inks commercially known as CE039A and CE042A available from HP Inc. Adding a coloured fusing agent (for example a black fusing agent) may change the colour of the build material to which it is applied. For example, adding a black fusing agent to a white build material may result in the corresponding parts of the three-dimensional object to be generated being dark (e.g. black) in appearance.

In addition to a fusing agent, in some examples, a coalescence modifier agent may be used which acts to modify the effects of a fusing agent for example by modifying coalescence or to assist in producing a particular finish or appearance to an object, and such agents may therefore be termed detailing agents. Detailing agents may also be applied to produce a cooling effect. In some examples, detailing agent may be used near edge surfaces of an object being printed. According to one example, a suitable detailing agent may be a formulation commercially known as V1Q61A "HP detailing agent" available from HP Inc. A colouring agent, for example comprising a dye or colourant, may in some examples be used as a fusing agent or a coalescence modifier agent to provide a particular colour for the object.

As noted above, additive manufacturing systems may generate objects based on structural design data. This may involve a designer generating a three-dimensional model of an object to be generated, for example using a computer aided design (CAD) application. The model may define the solid portions of the object, and in some examples properties such as colour, strength, density and the like. To generate a three-dimensional object from the model using an additive manufacturing system, the model data may in some examples be processed to generate slices of parallel planes of the model. Each slice may define a portion of a respective layer of build material that is to be solidified or caused to coalesce by the additive manufacturing system.

According to some examples, for a given type and thickness of build material and energy used to fuse the build material, there may be a default level of fusing agent that is applied to the build material. If the energy applied to a layer of build material is constant, then adding fusing agent to the layer will change the build materials' absorptivity such that, the more fusing agent that is applied to the build material, the greater the absorptivity and the better the fusion of the build material when the energy is applied. However, there may be a practical limit on the amount of fusing agent to be applied since too much fusing agent may tend to cool the building material down so that the heat used to fuse the part together may be used to evaporate the excess liquid components of the fusing agent. This default level may be selected to produce a suitable level of fusing of the build material following the application of energy. The default level may therefore represent an amount that is both sufficient to ensure that the particles of the build material are adequately fused (e.g. have a sufficient absorptivity) but not too high that excess liquid cools the part (in which case some of the applied energy may evaporate the excess liquid components of the fusing agent).

Applying fusing agent may affect the colour of the object since increasing the concentration of a darker-coloured fusing agent applied to a lighter-coloured build material may result in a darker-coloured object. When darker coloured fusing agents (for example black fusing agents) are applied to a region of a build material at this default level the result in a corresponding portion of an object that is substantially black (e.g. having the colour of the fusing agent).

Some examples herein relate to modifying the amounts of fusing agent (for example the density and contone level) to be applied to a build material to produce an intended colour in a corresponding part of a three-dimensional object to be generated, and applying a corresponding suitable amount of energy. These examples relate to applying a lower amount of fusing agent (e.g. than a default? Or target amount) to a build material so as to produce an intended colour in portions of a three-dimensional object to be generated. As above, as applying a darker coloured fusing agent to a region of a build material at a default level may result in a corresponding portion of an object that is substantially black. According to some examples herein, by modifying the amount of a black fusing agent applied, regions of build material can be successfully fused to have a colour in between the colour of the build material and the colour of the fusing agent. For example, lower amounts of a darker-coloured fusing agent may be applied to a light-coloured build material to produce a three-dimensional object having a colour that is substantially the colour of the build material. In other words, lower concentrations of the fusing agent result in the object having its colour substantially the same as the colour of the build material since lower amounts of the agent are present to colour the build material. In this way, an intended colour ranging in between the colour of the build material and the colour of the fusing agent may be produced in a three-dimensional object to be generated by varying the fusing agent density or contone level, to be applied to produce this intended colour in the object. In these examples, higher concentrations of fusing agent may result in a colour closer to the colour of the fusing agent (for example, black), and lower concentrations of fusing agent may result in in a colour closer to the colour of the build material (for example, white). In these examples, the amount of fusing agent is non-zero and is still sufficient for the powder-like build material to ensure melting of the build material when a suitable amount of heat is applied. In this sense, the amount of fusing agent may be regarded as the lowest non-zero amount to ensure fusion of the build material; this balance therefore ensuring that the object is adequately fused but remains the colour of the build material in appearance.

Some examples herein relate to applying different amounts of fusing agent to a build material to produce an object having an intended colour, which may be the first colour (as discussed above), or the second colour or a colour therebetween. By a colour therebetween it is meant a colour having at least one colour property (for example, hue, tint, shade, tone, saturation, lightness, chroma, intensity, brightness, reflectance, grayscale) that is in between the colour property of the first colour and the second colour. For example, a portion of an object having a grey colour may be generated according to examples herein, from a white build material and black fusing agent, by applying fusing agent in a contone level in between a contone level of 1 and the default level. In another example a portion of an object having a black colour may be generated according to examples herein from a white build material and black fusing agent by applying fusing agent in a contone level at, or greater than, the default.

Some examples herein therefore relate to applying differing amounts of fusing agent to a build material in order to produce the intended colour, which may be the first colour, second colour, or a colour therebetween.

Some examples herein relate to applying differing amounts of fusing agent to a build material in order to print an object having two different colours (for example two colours, each having a different colour property including hue, tint, shade, tone, saturation, lightness, chroma, intensity, brightness, reflectance, grayscale). For example, the density of a darker-coloured (e.g., black) fusing agent applied to a lighter-coloured build material (e.g., white) may be varied in order to produce darker and lighter coloured areas of the object. The density may be varied across a single layer of build material to across multiple layers of build material.

Figure 1:
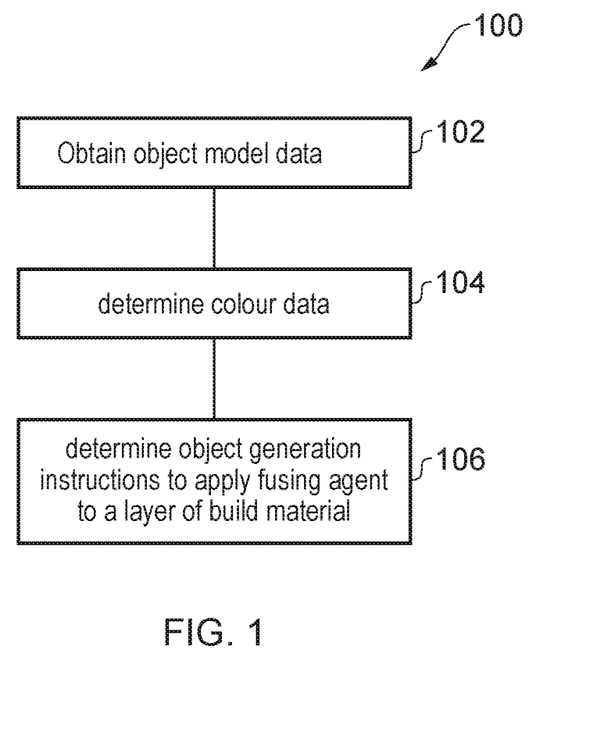
FIG. 1 is a flowchart of an example method of processing data for use in additive manufacturing.

FIG. 1 is an example of a method 100 of additive manufacturing, which may comprise a computer implemented method, and/or which may comprise a method of generating at least one object by additive manufacturing. The method comprises, in block 102, obtaining, e.g. by a processor, object model data, the object model data describing at least a portion of an object to be generated in additive manufacturing using a build material having a first colour and a fusing agent having a second colour, the second colour being different from the first colour. For example, the second colour has a different colour property to the first colour, the colour property being one of hue, tint, shade, tone, saturation, lightness, chroma, intensity, brightness, reflectance, grayscale.

The object model data may comprise data representing at least a portion of an object to be generated by an additive manufacturing apparatus by fusing (e.g. thermal fusing through application of energy) or solidifying a build material. The object model data may, for example, comprise a Computer Aided Design (CAD) generated model, and/or may, for example, be represented in a suitable file format, such as in a STereoLithographic (STL) data file. In some examples, the object model data may be received over a network, or received from a local memory or the like. In some examples, the object model data may define the shape of a portion of an object, i.e. its geometry. In some examples, the data may additionally define an appearance property, for example at least one intended colour, pattern, translucency, gloss or the like. In some examples the data may define at least one mechanical property, for example strength, density, resilience or the like. In some examples, the data may define at least one functional property, for example, conductivity in at least one object portion. Such properties may be associated with regions of the object, for example a colour may be defined at an object surface.

In some examples, the object may be defined in terms of sub-volumes, each of which represents a region of the object which is individually addressable in object generation. In some examples herein, the sub-volumes may be referred to as voxels, i.e. three-dimensional pixels, wherein each voxel occupies or represents a discrete volume. In some examples of additive manufacturing, three-dimensional space may be characterised in terms of such voxels. In some examples, the voxels may be determined bearing in mind the print resolution of an object generation apparatus, such that each voxel represents a region which may be uniquely addressed when applying print agents, and therefore the properties of one voxel may vary from those of neighbouring voxel(s). In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape. In some examples, voxels are cuboids having the height of a layer of build material. In some examples, in processing object model data representing an object, each voxel may be associated with properties, and/or object generation instructions, which apply to the voxel as a whole.

In other examples, the object may be described in some other way, for example using a vector or polygon mesh-based model. In some such examples, a voxel model may be derived from another model type.

In some examples, the method of FIG. 1 may be carried out on a slice-by-slice basis. In some examples, each slice may correspond to a layer of an object to be generated in a layer-by-layer additive manufacturing process. In some examples, such slices may be slices of a virtual build volume modelling an intended 'real' build volume, and may comprise slices taken from more than one object model. In some examples, the slices may be one voxel thick.

The method 100 comprises, at block 104, obtaining, e.g. by a processor, colour data. The colour data describes an intended colour of at least a portion of the object to be manufactured by additive manufacturing. The intended colour is substantially the first colour (e.g. the colour of the build material), the second colour (e.g. the colour of the fusing agent) or any colour therebetween. The method 100 may therefore be a method of generating an object having its colour substantially the same as the colour of the build material used to generate that object or a colour between the colour of the build material and the colour of the fusing agent, even though coloured fusing agent has been applied to the build material during the additive manufacturing process.

For example, a light-coloured build material may be used and a dark-coloured fusing agent (e.g. a fusing agent comprising carbon black) may be used in the additive manufacturing process, to generate a portion of an object having substantially the light colour of the build material, or a colour between the light colour of the build material and the dark colour of the fusing agent. The portion of the object may be part of the external surface of the object, or part of an internal portion of the object.

The method 100 comprises, at block 106, determining (e.g. by a processor) object generation instructions to apply the fusing agent to a first region of the layer of the build material at a contone level such that the colour of the portion of the object corresponding to the first region of the layer of build material is substantially the same as the intended colour described by the colour data. The first region of the layer corresponds to a portion of the object to be generated.

Applying a black fusing agent to a build material causes the build material to become darker, thereby increasing its absorptive properties to aid its fusion when heat is applied to the build material. A default contone level of fusing agent to be applied to the build material may, in some examples, be a level that colours the build material using the minimum amount of fusing agent, for example, at a contone level that ensures a good degree of fusion without cooling the part down and being evaporated from the build material (rather than absorbed by it). In examples where the build material comprises PA12, PA11 and/or PP a default contone level may be between approximately 50 and 100 (e.g. 60) depending on the printmode used (which may, for example, be between approximately 20% to 40% of the maximum contone level that a printer can deliver). These contone levels may be enough to fuse the part without leaving excess fusing agent that is subsequently evaporated. In one example, block 106 comprises applying fusing agent at a contone level less than the default contone level so that the corresponding portion of the object has the intended colour (of the build material). In the example above where a build material comprising PA12, PA11 and/or PP is used and where the intended colour is the colour of the build material, block 106 may comprise applying fusing agent to the first region of the layer of build material at a contone level of 1 or 2 (e.g. approximately 0.7-0.8% of the maximum contone level of the printer). In other examples where a build material comprising PA12, PA11 and/or PP is used, block 106 may comprise applying fusing agent to the first region of the layer of build material at a range of contone levels between 1 and 10. Such a contone level is sufficient for a degree of fusing of the part but sufficiently low so that the build material retains substantially its colour (e.g. the first colour) during and after the fusing process. Block 106 may comprise applying a non-zero contone level of fusing agent and, in one example, may comprise applying the lowest possible level of fusing agent to ensure melting of the build material (for example applying fusing agent at a contone level of 1). As application of fusing agent at higher contone levels will result in the colour of the building material (and hence the object) to be closer to the second colour (of the fusing agent), the method 100 allows an object to be generated in additive manufacturing having its colour substantially the same as the colour of the build material, even though a fusing agent of a different colour has been applied to the build material, the object satisfying certain mechanical requirements (e.g. concerning the structural integrity of the object). In other examples, where the intended colour is darker (or closer to the second colour) then the fusing agent may be applied at higher contone levels (e.g. towards the default level).

The method 100 is therefore, in one example, a method of generating a three-dimensional object having (substantially) a first colour in a 3D printing system using a build material of the first colour and a fusing agent of a second colour. In this example the method 100 may therefore be a method of generating a light-coloured three-dimensional object in a 3D printing system using a fusing agent having a black colour (e.g. a fusing agent comprising carbon black), and a build material having a white colour (e.g. a white powder-like granular material). In this example, fusing agent is applied to regions of the build material corresponding to portions of the object having the first, light, colour (in a non-zero but nevertheless low amount, e.g. a contone level of 1 or 2) so that the colour of the object is substantially the intended, light, colour whilst still ensuring that the build material melts during the fusing process. In other examples, the method 100 may be a method of generating a three-dimensional object having (substantially) the second colour, or a colour therebetween by applying fusing agent to regions of the build material to correspond to portion of the object to have the second colour in contone amounts greater than, for example, 1 or 2, depending on the colour.

The method 100 therefore allows an object to be generated in a 3D printing system using a black fusing agent and a white build material, the object having an intended colour and good mechanical properties (e.g. structural integrity). In one example, the object generation instructions (generated at block 106) may be to selectively apply fusing agent to a plurality of layers of build material, for example to each layer of build material. For example, the object model data may describe a plurality of slices, each slice defining a region of a respective layer of build material used to generate the object. In this example fusing agent may be applied to the each layer that is to be used to generate the object (each layer defined by each slice) and so the method 100 in this example will be to generate an object, and in one example the object is to be the first colour (the colour of build material). The whole object in this example may be generated by applying fusing agent to the build material at a contone level so that the whole part has the first colour (e.g., 1 or 2). The non-zero contone level will ensure that the whole part is adequately fused. The degree of fusion may make such a part ideal for utilisation in draft printing or prototyping, since a low amount of fusing agent has been used to print the part, consequentially reducing the costs for producing the prototype part. If the whole part is white (e.g. if the build material is white) then the part of this example may facilitate a post-processing operation such as colouring (e.g. by dyeing) the part. As dyeing parts that are printed in darker colours (e.g. black, for example the colour of the fusing agent) may be difficult the method 100 allows for white parts to be printed, which can result in a better quality dyed part. In other examples (to be described with reference to the FIG. 2, the core of the part may be printed at a higher fusing agent contone level).

In some of the examples above, and in some examples presented below, a white build material has been exemplified in order to highlight a contrast between a build material colour and a darker coloured fusing agent. However, in other examples, a build material of any suitable colour may be used.

In some examples, determining object generation instructions may comprise applying halftoning to voxels associated with object generation parameters to determine object generation or print instructions for the layer. As will be familiar to the skilled person, halftoning can result in the selection of a particular print agent in a particular location. For example, an object generation parameter may specify an area coverage or contone level for a print agent. A halftoning screen or algorithm may be used to make selections of locations and amounts of print agents to be placed to produce an intended result (which may be fusion of build material in a simple example), for example based on the area coverage. While halftoning is used in this example, in other examples, other techniques may be used. For example, if using piezo printheads, a drop volume could be directly specified.

Obtaining (e.g. at block 102 and/or 104) may comprise generating, retrieving, or determining. For example, block 104 may comprise generating, retrieving or determining the colour data (e.g. on receipt of the object model data a processor may retrieve, e.g. from a database, the colour data or generate the colour data describing the intended colour).

Figure 2:
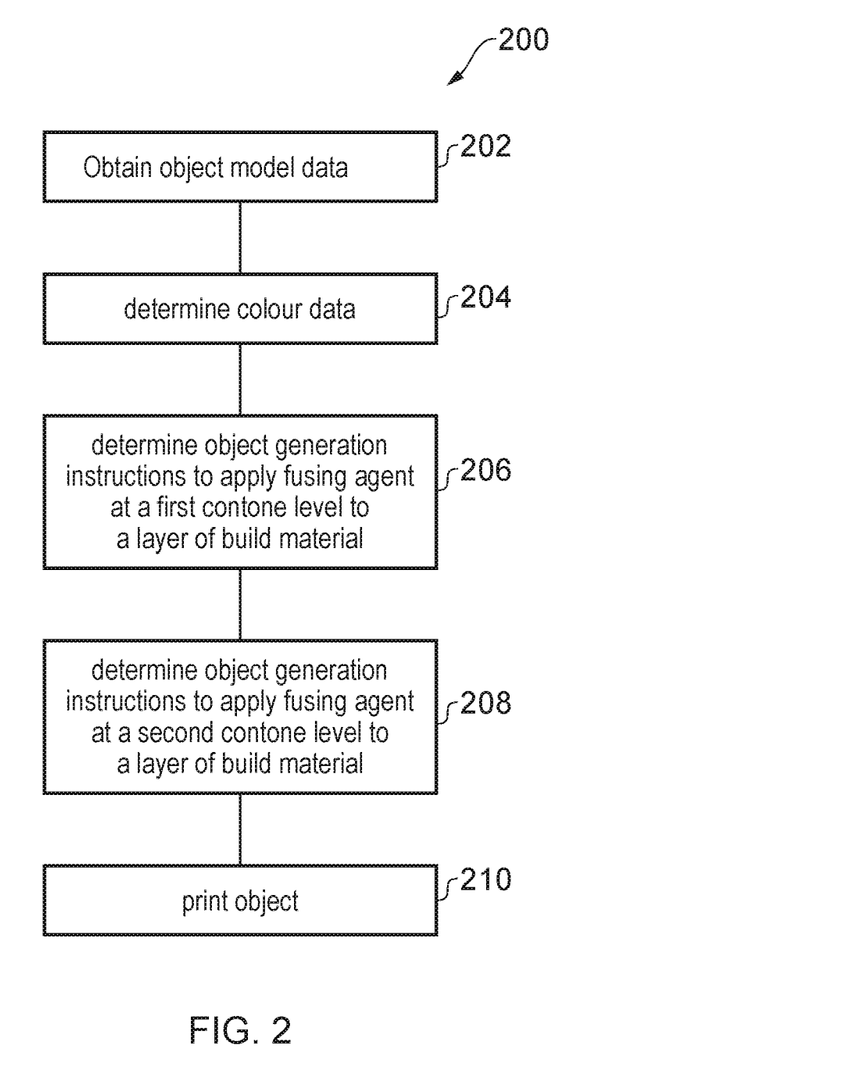
FIG. 2 is a flowchart of an example method of generating an object.

FIG. 2 is an example of a method 200, which may comprise a computer implemented method, and/or which may comprise a method generating at least one object by additive manufacturing. The method comprises, in block 202, obtaining, e.g. by a processor, object model data, the object model data describing at least a portion of an object to be generated in additive manufacturing using a build material having a first colour and a fusing agent having a second colour, the second colour being different from the first colour, for example as described above in relation to block 102 of method 100.

The method 200 comprises, at block 204, obtaining, e.g. by a processor, colour data, for example as described above in relation to block 104 of method 100. In this example, however, the colour data describes a first intended colour of a first a portion of the object to be manufactured by additive manufacturing and a second intended colour of a second a portion of the object to be manufactured by additive manufacturing. In this example, the first intended colour is substantially the first colour (e.g. the colour of the build material) and the second intended colour is darker than the first intended colour.

The method 200 comprises, at blocks 206 and 208, determining (e.g. by a processor) object generation instructions to apply the fusing agent to a region of the layer of the build material, for example as described above in relation to block 106 of method 100. Block 206 comprises determining object generation instructions to apply the fusing agent to a region of a layer of the build material corresponding to the first portion of the object at a first contone level. Block 208 comprises determining object generation instructions to apply the fusing agent to a region of a layer of the build material corresponding to the second portion of the object at a second contone level. In this example the second contone level is greater than the first contone level. The first contone level is non-zero so as to result some degree of fusion of the regions of the building material to which fusing agent is applied, the degree of fusion being sufficient so that the object has a minimum structural integrity. Accordingly, the object model data may describe a plurality of slices, each slice defining a region of a respective layer of build material used to generate the object and, the respective regions of build material corresponding to the first and second portions may be on the same, or different layers.

Therefore, the method 200 allows for an object to be generated in additive manufacturing having two different colours (e.g. two colours with different colour properties), with one of those colours being substantially the same as the first colour (of the build material used to generate the object, and the other colour being darker than the first colour. In one example, the method 200 may be used to generate an object having white and dark (e.g. black) areas, e.g. by using a white build material and black fusing agent. As fusing agent will be applied to the build material corresponding to the darker areas at a greater contone level this will mean that these areas of the build material will have a greater absorptivity than those areas of build material that will become portions of the object that are the first colour. Therefore, the method 200 allows for an object to be generated that has two different mechanical properties, for example the dark areas of the object (to which a higher contone level of fusing agent was applied to the build material) may exhibit a greater degree of fusion than the other (lighter-coloured) areas.

For example, the second, greater, contone level may be a default contone level having regard to the type and thickness of build material used and the amount of energy applied. As explained above in relation to block 106 of the method 100, the default contone level of fusing agent may be one that ensures a target degree of fusing without cooling the part down and evaporated from the build material (rather than absorbed by it). Therefore, in some examples of the method 200 where the build material comprises PA12, PA 11 and/or PP the second contone level may be between approximately 50 and 100 depending on the printmode used and the first contone level may be, for example, 1 or 2 (or between 1 and 10). The first contone level will therefore ensure sufficient fusion of the parts of the build material to which fusing agent is applied at this level and also result in the corresponding portions of the object having their colour substantially equal to the first colour (e.g. the colour of the build material), whereas other areas (to which fusing agent was applied according to the second contone level, e.g. between 50 and 100) will be darker (e.g. black) in appearance. If the build material is white this may result in an object having white and dark parts.

In one example the second intended colour is substantially the same as the second colour. In this example, the object generated according to the method 200 will have an area that is substantially the same colour as the build material and another area that is substantially the same colour as the fusing agent. In this example, when a white building material and black fusing agent are used this may result in the object having white and black parts. This, in turn, may allow some objects to be printed with unique information per part, for example a logo, pattern, identification code, text etc. which is visible through the contrasting colours produced in the part. For example, the varying contone levels of black fusing agent applied to a white build material (as in some examples above) may be used to produce a barcode in a portion of a three-dimensional object, with the black areas of the barcode corresponding to those areas of the build material to which fusing agent was applied in the higher contone level and the white areas of the barcode corresponding to those areas of the build material to which fusing agent was applied in the lower contone level (these areas resulting in the corresponding portions of the object being the colour of the build material—white in this example). In other examples, the object may be printed white with black text, or printed black with white text etc.

Blocks 206 and 208 respectively comprise determining instructions to apply fusing agent at first and second contone levels to first and second regions of the build material, respectively corresponding to first and second portions of the object. In one example the first portion is an external surface of the object and the second portion is an internal portion of the object. In this example the regions of each layer of build material that define an external object surface are printed with lower contone levels to have its colour the same colour as the first colour (of the build material) and those portions of each layer of build material that define an internal object portion are printed at the higher contone level. This means that the build material corresponding to the internal object portions may have a higher degree of fusion than the external object portions (since more fusing agent was applied) and may therefore exhibit greater structural integrity than the external portion. This example could be used to print a part that has a perimeter that is the colour of the build material (e.g. printed using fusing agent with a contone level of 1 or 2) but has a more structurally sound "core", as the core may be printed with a default contone level (for example, 50-100, e.g. 60) to ensure a greater degree of fusion. In examples where a black fusing agent and white build material are used the method 200 may produce an object white a white perimeter having a darker, e.g. a black, core, enabling the possibility of printing a white object having ordinary mechanical properties. As the object in this example is white, the object may then be dyed.

Block 210 comprises printing (or generating) the object using the object generation instructions. For example, block 210 may comprise applying heat to the layer(s) to fuse the layer(s). For example, this may comprise forming a layer of build material, applying print agents, for example through use of 'inkjet' liquid distribution technologies, in locations specified in the object generation instructions for an object model slice corresponding to that layer, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dpi, or 1200 dpi. A further layer of build material may then be formed and the process repeated, with the object generation instructions for the next slice.

In some examples, blocks 206 and 208 may be carried out at least partially concurrently with object generation in block 210. As the processes of blocks 206 and 208 can be relatively resource heavy in terms of processing power and memory storage, this may make efficient use of the resources available.

Figure 3:
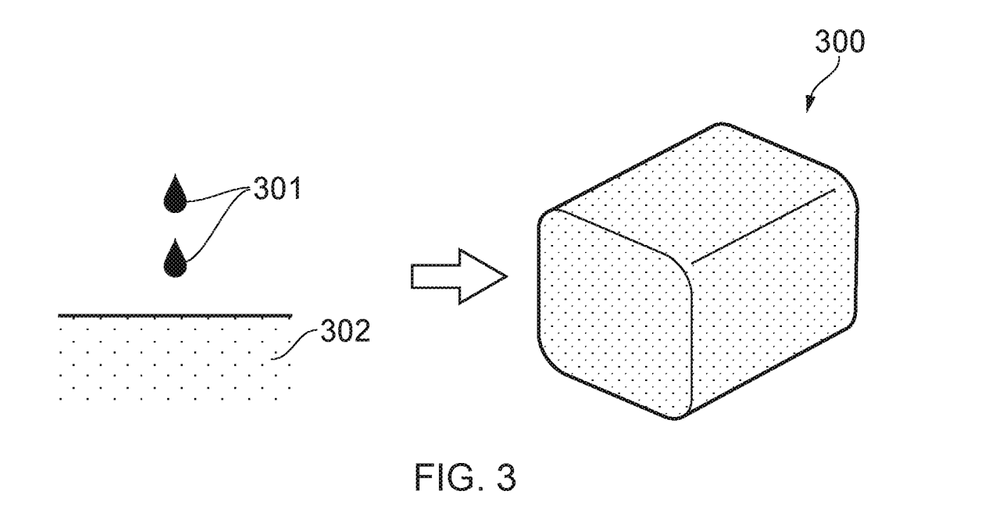
FIG. 3 is an example of a three-dimensional printed object.
Figure 4:
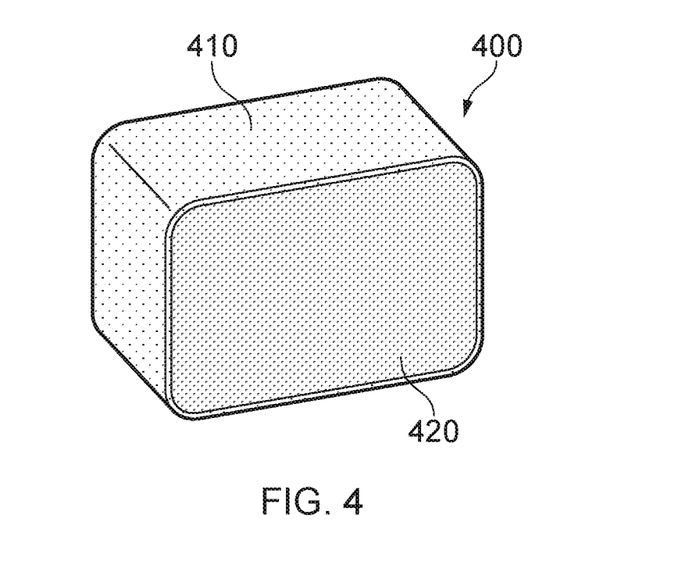
FIG. 4 is an example of a cutaway through a three-dimensional printed object.

FIGS. 3 and 4 show, respectively examples of a three-dimensional printed objects 300 and 400, shown in these examples as a cuboid, and shown in these examples having the colour of the build material used to generate the object. Each object 300, 400 comprises a layer (e.g. corresponding to a slice as defined by object model data) formed by fusing a layer of a build material at a first colour, wherein a first portion of the layer comprises fused build material and a fusing agent remnant following evaporation from a solvent from an applied fusing agent when the region of the layer of build material was fused to form the layer, the applied fusing agent being of a second colour different from the first colour, and wherein the colour of the first portion of the layer has substantially the same colour property as a colour property of the first colour. The colour property may be one of hue, tint, shade, tone, saturation, lightness, chroma, intensity, brightness, reflectance, grayscale.

For example, the object 300 comprises an external surface formed by a layer 302 of build material to which a fusing agent 301 has been applied, and then subsequently fused to form the first portion of the layer. The colour of the external surface of the object 300 has substantially the same colour property as the first colour (the colour of the build material 302). In this example the fusing agent is depicted as being of a darker colour. In the depicted example the fusing agent 301 may be black and the build material 302 may be of a light colour. In this case the external surface is also be substantially the light colour of the building material (having substantially the same colour property as white, e.g. brightness, reflectance, etc.). The object 300 may be manufactured according to the method of FIG. 1. Accordingly, fusing agent 301 may be applied at a contone level (for example a lower contone level such as 1 or 2) such that the build material, when fused, has its colour property the same as the first colour. As discussed above in relation to the method 100 the degree of fusion of such a part may be lower than if the fusing agent were applied at a higher contone level, but the lower contone level ensures that the colour of the part of the same as the colour of the build material. The external surface of the object 300 therefore has the same colour as the colour as the build material, which in some examples may be white even though a black fusing agent has been used to generate the object 300. In the example of FIG. 3, each layer of building material used to generate the object 300 has had the black fusing agent 301 applied in substantially the same contone amounts. In other words, the object 300 of the FIG. 3 example is wholly e.g. (internally and externally) the same colour, the light colour of the build material. Such an object 300 is ideal for colouring or use in prototyping.

The object 400 comprises at least two layers to which fusing agent in different contone levels have been applied. According to the FIG. 4 examples, the colour of the external surface 410 of the object 400 has substantially the same colour property as the first colour (the colour of the build material used to generate the object), even though a fusing agent of a darker colour has been used. the FIG. 4 example, the object 400 comprises an internal portion 420 of the object 400. Both the external surface 410 and the internal portion 420 comprise fused build material and a fusing agent remnant following evaporation of a solvent from an applied fusing agent when the layers of build material were fused to form the object 400, the fusing agent being of a second, different, colour to the first colour of the build material. As can be seen from FIG. 4, the colour of the external portion 410 has a substantially same colour property as a colour property of the colour of the build material and the colour of the internal portion 420 has a substantially same colour property as a colour property of the fusing agent. Therefore, according to example of FIG. 4, the external surface 410 of the object 400 has substantially the same colour as the colour of the build material but the internal portion 420 has substantially the same colour as the colour of the fusing agent. Where a black fusing agent and a white material is used the object 400 will, in this example, therefore have a substantially white perimeter and black core. The object 400 may be manufactured according to the method of FIG. 2. Accordingly, the fusing agent may be applied to regions of the build material corresponding to the external surface 410 at a contone level of, for example, 1 or 2, such that the build material, when fused, has the same colour property as the first colour (of the build material), and fusing agent may be applied to regions of the build material corresponding to the internal portion 420 at a contone level of between 50 and 100, e.g. 60. This results in an object 400 with a lighter perimeter having a darker core with greater structural integrity since more fusing agent has been applied to the build material corresponding to the core. If a white build material is used, then the external surface of the object 400 may be white in appearance. The object 400 may then be dyed etc.

In some examples, the object 400 may be manufactured with lighter and darker portions throughout the object. For example, the portions with a lower density of fusing agent may not be on the external surface of the object, but may instead be a portion of the interior of the object. In another example, the object 400 may have light and dark areas forming a pattern, text, logo, or code etc.

Figure 5:
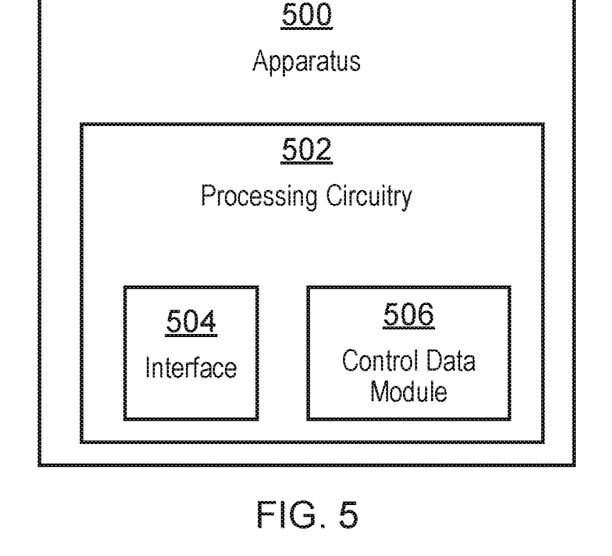
FIG. 5 is a simplified schematic drawing of an example of apparatus for processing data for additive manufacturing.

FIG. 5 shows an example apparatus 500 comprising processing circuitry 502. The processing circuitry 502 comprises an interface 504 and a control data module 506. The interface 504 is to obtain (for example, generate, determine or receive) object model data and colour data. The object model data describes at least a portion of an object to be manufactured by additive manufacturing using a build material having a first colour and a fusing agent having a second colour different from the first colour. The colour describes an intended colour of at least a portion of the object to be manufactured by additive manufacturing. The intended colour may be substantially the first colour, the second colour, or any colour therebetween. For example, the intended colour may have a colour property that is substantially equal to a corresponding property of the first colour, second colour or any colour therebetween. The control data module 506 is to generate control data to control a 3D printer to generate the object by selectively fusing successive layers of build material, wherein the control data module is to generate control instructions to control a print agent applicator to apply fusing agent to a first region of the build material corresponding to portion of the object to be generated, the fusing agent being of the second colour at a contone level such that the portion of the object corresponding to the first region of build material has a colour substantially equal to the intended colour as described by the colour data. The control data may therefore be to control a 3D printer to generate (part of) an object having the first colour, the second colour, or a colour therebetween. The portion of the object o have the intended colour may be part of the external surface of the object, or part of an internal portion of the object.

In examples where the intended colour is the first colour, the control instructions may be to apply the fusing agent at a contone level between 1 and 10 (in one example a level of 1 or 2) to ensure some level of fusing of the build material but not sufficient colouration of the build material so that, when fused, it retains its original colour.

In one example therefore, the intended colour is a first intended colour of a first portion of the object to be manufactured and the colour data describes a second intended colour of a second portion of the object to be manufactured. In this example, the second intended colour may be darker than the first intended colour, and the control data module may be to generate control instructions to control a print agent applicator to apply the coloured fusing agent to a region of a layer of the coloured build material that corresponds to the first portion of the object at a first contone level. In this example, the control instructions may be to apply the coloured fusing agent to a region of a layer of the coloured build material that corresponds to the second portion of the object at a second contone level, the second contone level being greater than the first contone level. For example, the control instructions may be to apply fusing agent to a region of a layer of the coloured build material that corresponds to the first portion of the object at a first contone level or 1 or 2 and to apply fusing agent to a region of a layer of the coloured build material that corresponds to the second portion of the object at a second contone level of between 50 and 100 (e.g. 60). Therefore, in one example, the second intended colour may be substantially the same as the second colour (e.g. the colour of fusing agent) and accordingly fusing agent may be applied to a region of the layer of build material corresponding to the second portion of the object at a contone level so that the corresponding portions of the object are coloured the same as the fusing agent. The first portion may, in one example, be an external surface of the object to be manufactured. The second portion may, in one example, be an internal portion of the object to be manufactured.

Figure 6:
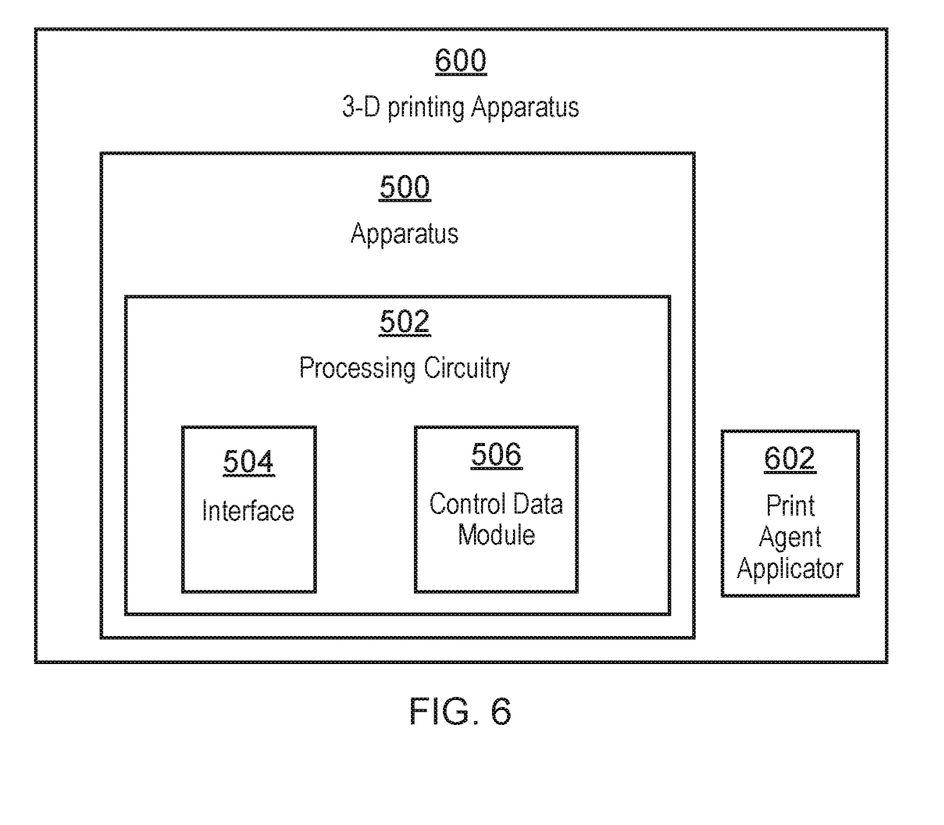
FIG. 6 is a simplified schematic drawing of an example apparatus for additive manufacturing.

FIG. 6 shows an example of a 3-D printing apparatus 600 comprising the apparatus 500 of FIG. 5.

The 3-D printing apparatus 600 comprises a print agent applicator 602. The print agent applicator 602 is to apply fusing agent, under control of the control instructions generated by the control data module 506, in contone levels and/or densities corresponding to the colour data obtained by the interface 504.

In some examples, the 3-D printing apparatus 600 may operate under the control of control data generated based on the print instructions to generate at least one object in a plurality of layers according to the generated control data/print instructions. The 3-D printing apparatus 600 may generate an object in layer-wise manner by selectively solidifying portions of layers of build materials. The selective solidification may in some examples be achieved by selectively applying print agents, for example through use of 'inkjet' liquid distribution technologies, and applying energy, for example heat, to the layer. The 3-D printing apparatus 600 may comprise additional components not shown herein, for example a fabrication chamber, a print bed, print head(s) for distributing print agents, a build material distribution system for providing layers of build material, energy sources such as heat lamps and the like, which are not described in detail herein.

The processing circuitry 502 or the modules thereof, and/or the 3-D printing apparatus 600 may carry out any or any combination of the blocks of FIG. 1 or 2.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    obtaining, by a processor, object model data for an object to be generated by an additive manufacturing printing apparatus that deposits layers of build material and selectively applies a fusing agent to the build material on a layer-by-layer basis and then selectively fuses the build material via energy application,
        wherein the fusing agent is configured to promote fusing of the build material during the energy application by absorbing the energy,
        wherein no colorant is applied to the deposited layers of build material during generation of the object other than the fusing agent,
        wherein the build material and the fusing agent have different colors, and
        wherein the fusing agent has a default level of application that corresponds to a minimum level at which the fusing agent has to be applied for an object to have specified mechanical requirements when the object is generated;
    obtaining, by the processor, color data describing a first intended color of a first region of the object that is closer to the color of the build material than to the color of the fusing agent, and a second intended color of a second region of the object that is closer to the color of the fusing agent than to the color of the build material, each of the first and second regions having an external surface;
    specifying, by the processor, a first level of application of the fusing agent lower than the default level and that is sufficient to cause the build material to fuse and that results in the first region having the first intended color;
    specifying, by the processor, a second level of application of the fusing agent higher than the default level and that results in the second region having the second intended color;
    determining, by the processor, object generation instructions such that the first region is to receive the fusing agent at the determined first level and the second region is to receive the fusing agent at the determined second level; and
    causing, by the processor, the additive manufacturing printing apparatus to execute the object generation instructions to generate the object.

2. The method of claim 1, wherein no detailing agent is applied to the layers of the build material during generation of the object.

3. A non-transitory storage medium storing program code executable by a processor to perform processing comprising:
    obtaining object model data for an object to be generated by an additive manufacturing printing apparatus that deposits layers of build material and selectively applies a fusing agent to the build material on a layer-by-layer basis and then selectively fuses the build material via energy application, wherein the fusing agent is configured to promote fusing of the build material during the energy application by absorbing the energy, wherein no colorant is applied to the deposited layers of build material during generation of the object other than the fusing agent, wherein the build material and the fusing agent have different colors, and wherein the fusing agent has a default level of application that corresponds to a minimum level at which the fusing agent has to be applied for an object to have specified mechanical requirements when the object is generated;

obtaining color data describing a first intended color of a first region of the object that is closer to the color of the build material than to the color of the fusing agent, and a second intended color of a second region of the object that is closer to the color of the fusing agent than to the color of the build material, each of the first and second regions having an external surface;

specifying a first level of application of the fusing agent lower than the default level and that is sufficient to cause the build material to fuse and that results in the first region having the first intended color;

specifying a second level of application of the fusing agent higher than the default level and that results in the second region having the second intended color;

determining object generation instructions such that the first region is to receive the fusing agent at the determined first level and the second region is to receive the fusing agent at the determined second level; and causing the additive manufacturing printing apparatus to execute the object generation instructions to generate the object.

4. The non-transitory storage medium of claim 3, wherein no detailing agent is applied to the layers of the build material during generation of the object.

5. A system comprising:
a processor; and
a memory storing program code executable by the processor to:
obtain object model data for an object to be generated by an additive manufacturing printing apparatus that deposits layers of build material and selectively applies a fusing agent to the build material on a layer-by-layer basis and then selectively fuses the build material via energy application, wherein the fusing agent is configured to promote fusing of the build material during the energy application by absorbing the energy, wherein no colorant is applied to the deposited layers of build material during generation of the object other than the fusing agent, wherein the build material and the fusing agent have different colors, and wherein the fusing agent has a default level of application that corresponds to a minimum level at which the fusing agent has to be applied for an object to have specified mechanical requirements when the object is generated;

obtain color data describing a first intended color of a first region of the object that is closer to the color of the build material than to the color of the fusing agent, and a second intended color of a second region of the object that is closer to the color of the fusing agent than to the color of the build material, each of the first and second regions having an external surface;

specify a first level of application of the fusing agent lower than the default level and that is sufficient to cause the build material to fuse and that results in the first region having the first intended color;

specify a second level of application of the fusing agent higher than the default level and that results in the second region having the second intended color;

determine object generation instructions such that the first region is to receive the fusing agent at the determined first level and the second region is to receive the fusing agent at the determined second level; and cause the additive manufacturing printing apparatus to execute the object generation instructions to generate the object.

6. The system of claim 5, wherein no detailing agent is applied to the layers of the build material during generation of the object.

* * * * *